United States Patent [19]

Liou et al.

[11] Patent Number: 4,791,598

[45] Date of Patent: Dec. 13, 1988

[54] TWO-DIMENSIONAL DISCRETE COSINE TRANSFORM PROCESSOR

[75] Inventors: Ming-Lei Liou; Ming-Ting Sun, both of Holmdel; Lancelot Wu, East Keansburg, all of N.J.

[73] Assignee: Bell Communications Research, Inc., Livingston, N.J.

[21] Appl. No.: 29,761

[22] Filed: Mar. 24, 1987

[51] Int. Cl.[4] .......................................... G06F 15/332
[52] U.S. Cl. .................................................. 364/725
[58] Field of Search ................................ 364/725, 726

[56] References Cited

U.S. PATENT DOCUMENTS

| | | | |
|---|---|---|---|
| 4,293,920 | 10/1981 | Merola | 364/725 |
| 4,385,363 | 5/1983 | Widergren et al. | 364/725 |
| 4,449,194 | 5/1984 | Wilhelm | 364/725 |
| 4,541,012 | 9/1985 | Tescher | 358/133 |
| 4,675,836 | 6/1987 | Arnould et al. | 364/725 |

FOREIGN PATENT DOCUMENTS 2144248A  2/1985  United Kingdom ................. 15/332

OTHER PUBLICATIONS

Kamangar et al., "Fast Algorithms for the 2-D Discrete Cosine Transform" *IEEE Trans-On Computers*, vol. G31, No. 9, Sep. '82, pp. 897–906.

Hague, "A Two-Dimensional Fast Cosine Transform" *IEEE Trans. on Acoustics, Speech and Signal Processing*, vol. ASSP-33, No. 6, Dec. 1985, pp. 1532–1539.

Kronander et al., "VLSI Implementation of the Discrete Cosine Transfrom" *Nordic Symposium on VLSI in Computers & Communication* Jun. 13–16, 1984, Tampere University of Technology, Finland, pp. 190–195.

Bacchi et al., "Real-Time Orthogonal Transformation of Colour-Television Pictures" *Philips Tech. Rev.*, vol. 38, No. 415, 1978/79, pp. 119–130.

Chow et al. "A Pipelined Distributed Arithmetic PFFT Processor" *IEEE Trans. on Computers*, vol. C-32, No. 12, Dec. 1983, pp. 1128–1136.

Bertram, "On the Derivation of the Fast Fourier Transform" *IEEE Trans. on Audio & Electroacoustics*, vol. AU-18, No. 1, Mar. 1970, pp. 55–58.

Afghahi et al., "An Array Processor for 2-D Discrete Cosine Transforms" *EUSIPCO-86 Signal Processing III; Theories & Applications*, Sep. 2–5, 1986, pp. 1283–1286.

"A Discrete Fourier-Cosine Transform Chip", *IEEE Journal on Selected Areas in Communications*, M. Vetterli et al., Jan. 1986, pp. 49–61.

*Primary Examiner*—David H. Malzahn
*Attorney, Agent, or Firm*—James W. Falk; Stephen M. Gurey

[57] ABSTRACT

This processor is capable of real time processing of blocks of video pixel or other two-dimensional data to yield the two-dimensional Discrete Cosine Transform (DCT) thereof. The processor can be used as part of a video bandwidth or image compression system. The circuitry comprises a first one-dimensional DCT processor which simultaneously computes an entire row or column of vector inner products by using distributed arthmetic and using decimation-in-frequency to reduce the amount of memory capacity (ROM) required. Partial sums may also be used to further reduce ROM size. The one-dimensional transformed matrix from the first processor is stored in a transposition memory and the transpose of the stored matrix is applied to a second one-dimensional DCT processor of similar circuitry which computes the desired two-dimensional DCT of the input data matrix.

7 Claims, 5 Drawing Sheets

TWO-DIMENSIONAL DISCRETE COSINE TRANSFORM PROCESSOR

FIELD OF THE INVENTION

This invention relates to a processor for converting spatial domain signals, e.g. video signals, into frequency domain signals by means of a mathematical procedure known as a Discrete Cosine Transform (DCT).

BACKGROUND OF THE INVENTION

The DCT is considered to be the most effective technique among various transform coding methods for image compression or video bandwidth compression. A DCT is similar to a Discrete Fourier Transform (DFT) but includes only cosine terms. In achieving bandwidth compression in this way, a square block of digitally encoded picture elements or pixels can be transformed into the frequency domain by means of a two-dimensional ($N \times N$) DCT processor to which the $N \times N$ block of pixel data is applied, and wherein the input data matrix is multiplied by an $N \times N$ discrete cosine matrix to yield an intermediate matrix, and then the transpose of the intermediate matrix is multiplied by the same discrete cosine matrix to yield the desired two-dimensional transformed matrix. The elements of the transformed matrix can then be quantized and only the most energetic terms therein need be transmitted. At the receiver an inverse transformation is performed to reconstruct the original video signal in the space domain. For the $N \times N$ DCT, larger N achieves better compression ratio but requires more computation.

Matrix multiplication involves forming the inner products of two $N \times 1$ vectors to yield a single element of the product matrix. Thus each element of a row of the input matrix must be multiplied by each of the corresponding elements of a column of the cosine matrix and the products summed to yield a single element of the product matrix. Thus, for the transformation of a $16 \times 16$ block of pixels, 16 products must be summed to yield a single element or coefficient of the intermediate and the transformed matrices, each of which has 256 elements. Many fast algorithms have been derived to reduce the number of computations required. For example, the DCT matrix has been decomposed into several sparse matrices, which result in butterfly structures. These butterfly structures reduce the computation significantly but still require many high speed multipliers which require large silicon area for IC implementation and result in messy interconnections, poor routing on chips, and irregular shape. All of these factors make VLSI (Very Large Scale Integration) implementation of butterfly structures very inefficient. An example of VLSI implementation of the DCT using such a structure is described in an article entitled, "A Discrete Fourier-Cosine Transform Chip" in the IEEE Journal on Selected Areas in Communication, Jan. '86, pp. 49-61. The resulting chip shown in FIG. 17 therein includes many multipliers, does not efficiently utilize the silicon area, and can implement only an $8 \times 1$, one-dimensional transform. The two-dimensional transform contains two one-dimensional transforms and needs temporary storage for intermediate results and matrix transposition, thus it is much more complex than the one-dimensional transform.

Our invention is a response to a need for real time processing of two-dimensional DCT which can be efficiently implemented by state-of-the-art VLSI technology. Our invention provides real time processing of $16 \times 16$ DCT on a single chip. This means that the processor must provide transformed $16 \times 16$ matrices for application to a quantizer at the same rate that the $16 \times 16$ input matrices are being generated by the video camera. The processor should be able to handle an input sample or pixel rate of 14.3 MHz which is a rate commonly used in digital video systems with present day MOS technology. Due to the large amount of computation required, real time processing at this rate can be achieved only by exploiting inherent concurrency and parallelism in the architecture. Also, since the silicon area and the design effort needed for implementing an algorithm are heavily dependent on the degree of regularity of the architecture, one can see that the challenge of efficiently implementing DCT in VLSI is to develop an architecture which can realize the enormous number of multiplications required with a regular structure.

SUMMARY OF THE INVENTION

Instead of mapping fast algorithms into silicon, we utilize, in accordance with our invention, distributed arithmetic combined with decimation-in-frequency, bit-serial and bit-parallel data structures, and partial sums to implement vector inner products concurrently and with minimal ROM size. Novel input/output and efficient matrix transposition circuitry have been devised. The result is architecture (or circuitry) with a highly regular structure and no multipliers. This is possible because of the inherent properties of transform operations, namely (1) the transform matrix coefficients are constants which permits the use of distributed arithmetic wherein memory look-up tables, or Read Only Memories (ROMs) are substituted for multipliers, and (2) the matrix-vector products are realized by several concurrent vector inner products. The decimation-in-frequency and partial sums are utilized to reduce the size of the look-up tables required. The bit-serial structure is used to implement the decimation-in-frequency so that the silicon area is minimal and the routing greatly simplified. The result is a two-dimensional DCT processor which consists only of memories, adders, and registers; no multipliers are required. The regularity of the highly concurrent operation of the circuitry allows for modular design, an ideal feature for VLSI implementation. Also, the architecture combines bit-serial and bit-parallel circuitry to maximum advantage. Our novel architecture can also be adapted for other two-dimensional linear operations.

Our two-dimensional DCT processor comprises an input one-dimensional ($N \times 1$) Column DCT processor to which the $N \times N$ input data block is sequentially applied column by column. The input or column processor is designed to generate the column transform of the input data with circuitry which utilizes distributed arithmetic with the added features of decimation-in-frequency and partial sums to reduce the amount of ROM required. The input $N \times 1$ processor is provided with N circuits, each of which comprises Read Only Memory (ROM) and an accumulator in cascade, and called RACs. The accumulators concurrently compute the elements of the column transform by shifting and adding of the data retrieved from the ROMs. The resultant intermediate vector is stored in one row of a $N \times N$ transposition memory which comprises a RAM. Each of the columns of the data matrix is applied to the input $N \times 1$ processor in sequence to produce the $N \times N$ intermediate matrix (Y) which is the product ($X^tC$) of the transpose of the data matrix ($X^t$) and the discrete cosine matrix (C) represented by the constants stored in the ROM. The superscripts "t" indicate the transpositions of the matrices. A second or output row $N \times 1$ DCT processor is then used to compute the one-dimensional $N \times 1$ DCT for each column of $X^tC$, which is retrieved from storage in the memory. The result of this second or row transform operation is thus $C^tXC$, which is the desired two-dimensional $N \times N$ DCT. The processor is provided with a control circuit which provides clock and other control signals to control the operations of the components described.

The input $N \times 1$ DCT processor comprises, an input register of N stages to which the input data is sequentially applied on $n_1$ parallel lines, wherein $n_1$ is the number of bits per word or pixel of input data. As soon as the input register fills up with a column of data, the entire column is shifted simultaneously in bit-parallel format to a holding register and the input register then starts to collect the next column of data. The data in each of the N stages of the holding register are then concurrently shifted out, one bit at a time, with the least significant bit first. The N-bit words so formed are converted into two N/2 bit words as part of a technique known as first stage decimation-in-frequency and the resultant N/2 bit words are used to address all of the ROMs of the RACs simultaneously. Since the first stage decimation changes the $n_1$ unsigned input data to $(n_1+2)$-bit 2's complement numbers, the same operation is repeated $n_1+2$ times and the $n_1+2$ words retrieved from each ROM are sequentially added to the contents of an accumulator comprising a shift register with a hard wired 1-bit right shift. The sign bit which is part of the data word results in subtraction instead of addition. The accumulated output of each of these RACs after each column of input data has been processed comprises a single coefficient or element of the column transform. The contents of all the RACs are transferred simultaneously and in bit-parallel format to an N-stage output register, after which the contents thereof are sequentially shifted into one row (or column) of the transposition memory on $n_2$ parallel lines. After the $N \times N$ memory is filled up in this fashion, the second or output $N \times 1$ Row DCT processor reads out the matrix stored in the RAM memory in a column by column (or row by row) fashion so that the transpose of $X^tC$ is obtained. The second $N \times 1$ DCT then generates the desired $N \times N$ two-dimensional DCT in the same way as does the first or input DCT processor. Both of the $N \times 1$ processors may comprise similar circuits, except that more bits may be required to represent the data in the second $N \times 1$ processor.

The novel two-dimensional $N \times N$ processor comprises a first $N \times 1$ DCT processor to which the transpose of an $N \times N$ block of input data is applied, by reading the original matrix column wise. The first $N \times 1$ processor comprising means to concurrently compute N inner vector products for each column of said input data using distributed arithmetic wherein the constants of the $N \times N$ discrete cosine matrix are stored in N RACs, each of which comprises a ROM plus an accumulator, the ROMs being addressed by N/2 bit words derived from the data words of said columns of input data. The words so retrieved from the ROMs are accumulated in a shift register by a shift and add operation, the output of each of the N RACs comprising a different element or coefficient of one row (or column) of an $N \times N$ intermediate matrix which comprises the $N \times 1$ transform of the block of input data. Circuitry is provided to store the intermediate matrix in an $N \times N$ RAM array and then to read out the transpose thereof to a second $N \times 1$ DCT processor which generates the desired two-dimensional $N \times N$ DCT by means of circuitry similar to that used to generate the aforementioned intermediate $N \times N$ matrix. Suitable control circuitry is provided to generate the required control signals.

It is thus an object of the invention to provide a two-dimensional DCT processor which can generate the transform of $16 \times 16$ blocks of binary coded video data on a real time basis and in which the architecture, circuitry and algorithm of said processor are chosen for ease of implementation by means of state-of-the-art VLSI technology, whereby the processor may be realized on a single CMOS chip.

Another object of the invention is to provide a one-dimensional $N \times 1$ DCT processor which can simultaneously process a column (or row) of data from an input data matrix to form a row of elements comprising the inner vector products of the column (or row) of input data and the N columns of a discrete cosine matrix which are stored in N RACs in the processor, and whereby the $N \times 1$ processor utilizes distributed arithmetic, first stage decimation-in-frequency and partial sums in computing the inner vector products, the processor comprising only registers, memories of small capacity, and adders.

A still further object of the invention is to provide a two-dimensional DCT comprising a one-dimensional DCT which comprises circuitry utilizing distributed arithmetic, RACs, decimation-in-frequency and partial sums to efficiently and simultaneously compute a plurality of elements comprising the vector inner products of a column of input data and a discrete cosine matrix which is stored in the RACs, and whereby columns of input data are thus sequentially processed to generate an intermediate $N \times N$ matrix which is stored in a RAM array and then the transpose of the intermediate matrix is read out to a similar one-dimensional DCT processor which similarly generates the desired two-dimensional $N \times N$ DCT.

A further object of the invention is to provide a $16 \times 16$ two-dimensional DCT capable of real time processing of blocks $16 \times 16$ video pixels and wherein the architecture, circuitry and algorithm of the processor are chosen to achieve high speed, complicated computations with a minimum of structure or circuitry and with simple controls. The architecture and circuitry chosen permit simultaneous (or concurrent) computation of several vector inner products without the use of multipliers but with ROMs of small capacity, and bit-serial and bit-parallel format are used in combination to save silicon chip area and simplify routing as well as to permit high speed operation to facilitate real time processing of video signals.

DETAILED DESCRIPTION

The Discrete Cosine Transform (DCT) is an orthogonal transformation consisting of a set of basis vectors which are sampled cosine functions. The Nth order DCT transform matrix, C, is defined by:

$$c_{k,l} = \sqrt{\frac{2}{N}} \cos\left[\frac{(2k-1)(l-1)\pi}{2N}\right] \quad (1)$$

for $k=1,2,3 \ldots N$, $l=2,3, \ldots N$, and $c_{k,1} = N^{-\frac{1}{2}}$ for $l=1$. In order to achieve bandwidth compression by means of the DCT, blocks of $N \times N$ video data in the form of unsigned binary-coded pixels must be subjected to two-dimensional transformation. The two-dimensional DCT of order N is defined as:

$$Y = C^t \times C \quad (2)$$

wherein Y is the transformed matrix, X is the data or video pixel matrix, and $C^t$ is the transpose of the discrete cosine matrix, C, defined by Equation (1).

The implementation of a two-dimensional $N \times N$ DCT can be accomplished by a prior art method known as the row-column decomposition technique; see the book entitled "Multidimensional Digital Signal Processing", by Dudgeon and Mersereau in Prentice Hall Signal Processing Series, 1984. In this prior art technique, the two-dimensional DCT is accomplished by two sequential one-dimensional DCTs wherein the data matrix is applied to the first one-dimensional DCT row-wise. In our invention, a variation of this technique is utilized wherein, as stated above, the transpose of the data matrix is obtained and applied to the first one-dimensional DCT processor by reading the data matrix column-wise instead of row-wise so that the transpose of the data matrix is obtained. This results in simplified circuitry. Thus in the present invention the output of the first one-dimensional $N \times 1$ DCT processor is $X^t C$ which is temporarily stored in the transposition memory and then another $N \times 1$ DCT is computed from the transpose of the stored matrix to yield the desired two-dimensional DCT (Y) of Equation (2). If speed is not important the two $N \times 1$ DCT computations can be time-shared by the same circuitry, but in the present case where real time operation is required, two $N \times 1$ processors are used.

Figure 1:
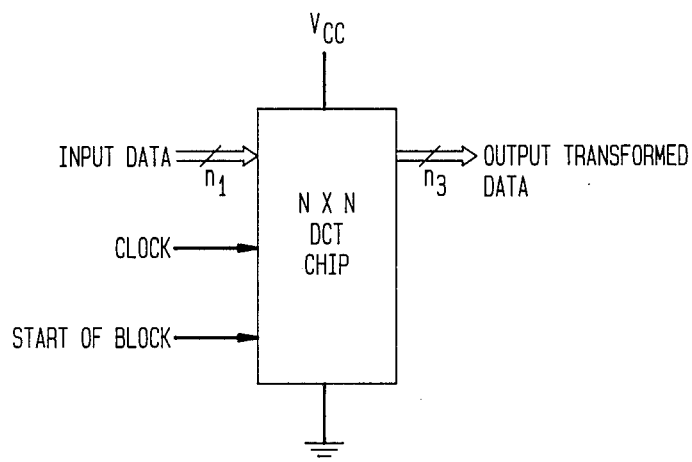
FIG. 1 shows the connections required when our invention is implemented on a single chip.

FIG. 1 is a diagram showing our invention implemented on a single chip. The connections to this chip comprise the bias voltage $V_{cc}$, ground, a sample clock and a Start-of-Block strobe. The input data is applied in parallel via $n_1$ parallel lines, one for each bit of the pixel words. The output transformed data may comprise $n_3$ parallel lines for the longer transformed words. The input and output data are shifted into and out of the chip continuously at the sample clock rate.

Figure 2:
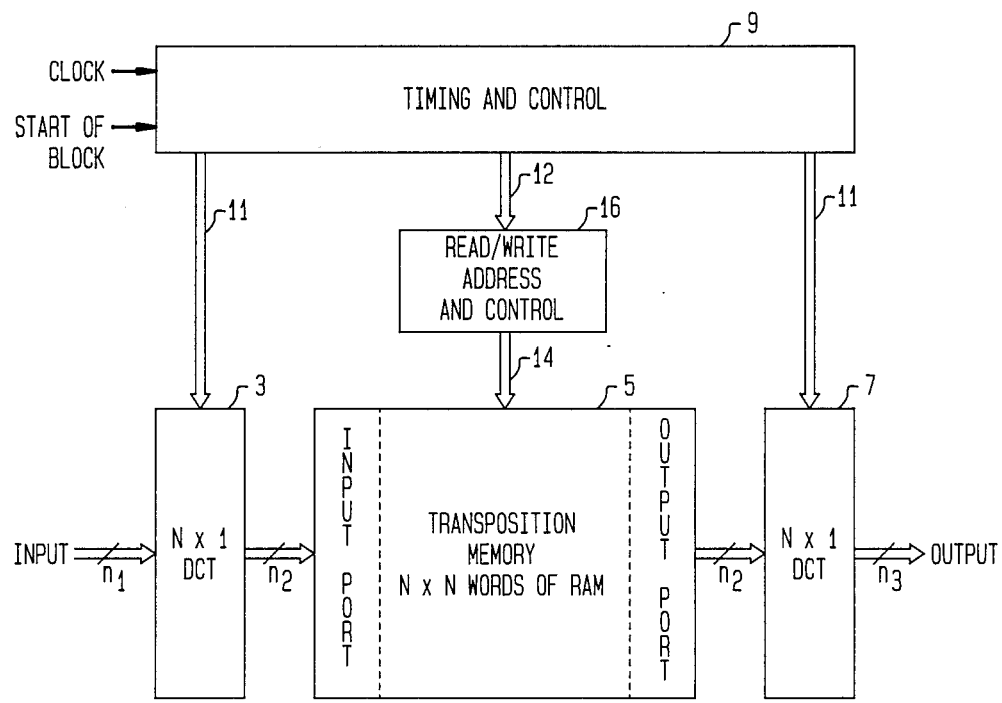
FIG. 2 shows an overall block diagram of one embodiment of our invention.

FIG. 2 shows the overall organization of our invention comprising the first or column $N \times 1$ DCT, 3, to which the input data is applied on $n_1$ parallel lines: the output of DCT 3 is temporarily stored, row or column-wise, in $N \times N$ transposition memory 5, which comprises a Random Access Memory (RAM) with separate input and output ports, as shown. The $n_2$ parallel lines from DCT 3 to memory 5 will normally comprise more bits than the input data, depending on the accuracy required. The stored matrix is applied column or row-wise (depending on how the intermediate matrix was stored), to the second or row $N \times 1$ DCT 7 via $n_2$ parallel lines. Thus the transpose of the stored matrix is read out. The output transformed data is obtained via $n_3$ parallel lines from the second $N \times 1$ DCT processor. A timing and control circuit 9 has a clock signal and the Start-of-Block strobe applied thereto from external circuitry and circuit 9 supplies several timing and control signals 11 and 12 to the processing circuitry. The read/write address and control circuit 16 receives control signals 12 from circuit 9 and applies via lines 14 appropriate read/write addresses and other control signals to the memory 5.

Each of the aforementioned vector inner products comprises a summation of N products. It can be shown mathematically that this computation can be realized without multipliers by the use of look-up tables comprising ROMs, whereby the required coefficients of the transformed matrices are obtained by shifting and adding of look-up table values obtained from the ROMs. This computational technique, which is also known in the art, is known as distributed arithmetic. The ROMs and the accumulators in which the shifting and adding takes place comprise units called RACs, and each RAC stores the constants representing a different column of the discrete cosine matrix.

Figure 3:
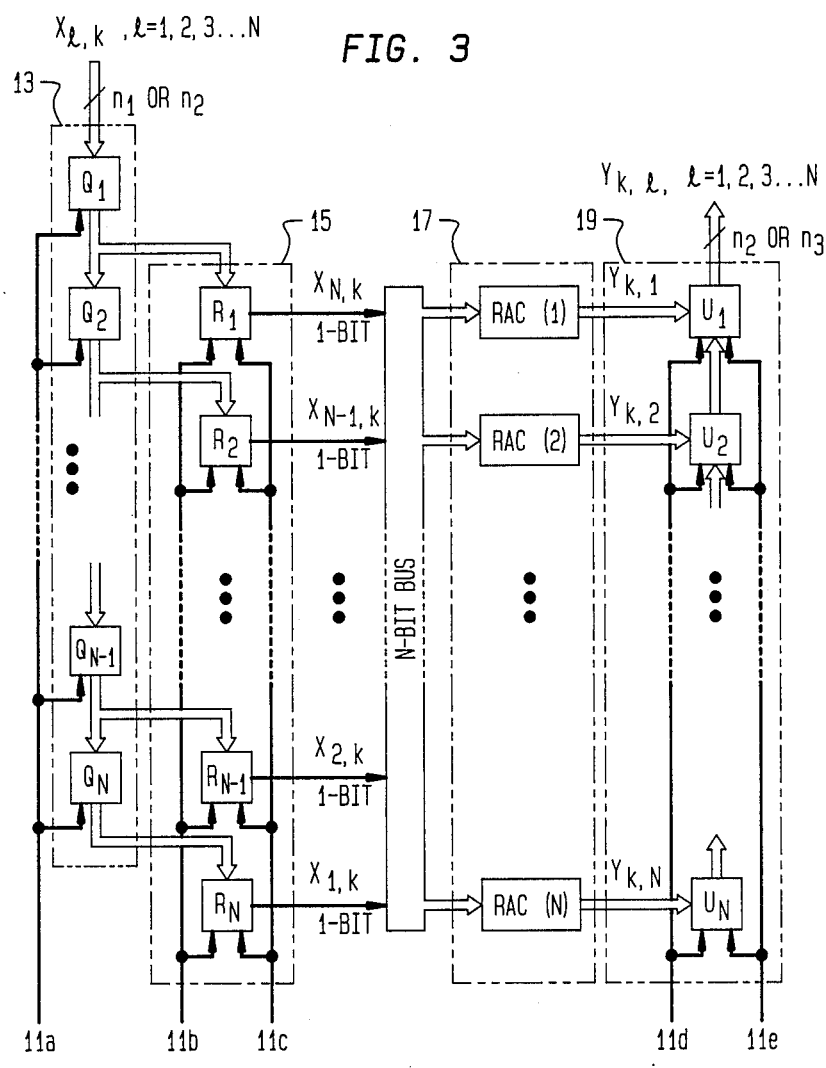
FIG. 3 shows a DCT processor utilizing distributed arithmetic and other features.
Figure 4:
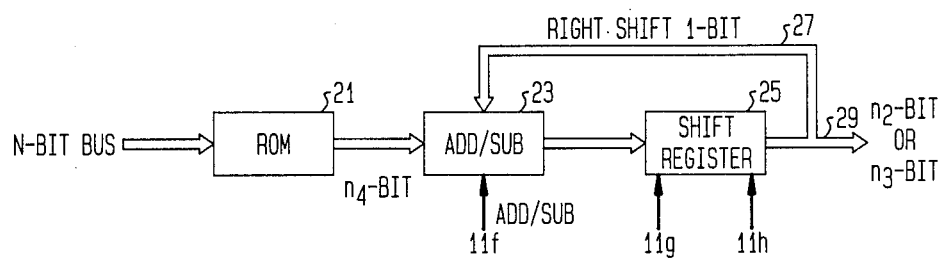
FIG. 4 is a block diagram of a RAC.

FIG. 3 and 4 show an $N \times 1$ DCT illustrating how distributed arithmetic functions and also illustrating some of the circuit features utilized in our invention. In FIG. 3, input register 13 comprises N stages $Q_1$-$Q_N$. Each column of pixels or other two-dimensional data, $x_{1,k} \ldots x_{N,k}$, is applied to stage $Q_1$ of register 13 in bit-parallel format at the data or clock rate of 1/T. By reading the pixel data matrix column-wise, the transpose thereof is accomplished. Video digital pixel data is normally encoded in 8-bit unsigned words, each representing the luminance of a pixel. Thus the data input would be applied to $Q_1$ on 8 (or $n_1$) parallel lines, and each register stage $Q_1$-$Q_N$ would comprise 8 (or $n_1$) bits in parallel. After N clock cycles the column would be completely loaded into the N stages of register 13. At that time control signals 11a and 11b from circuit 9 of FIG. 2 would transfer in parallel all of the 8 (or $n_1$) bit words from $Q_1$-$Q_N$ into the corresponding stages $R_1$-$R_N$ of holding register 15. The next column of input data would then begin to fill up input register 13, while the remainder of the circuitry is performing concurrent computation of N inner vector products to obtain the one-dimensional transform of the data in the holding register. In performing this concurrent computation, the data in the holding register is shifted out, 1 bit at a time, with the least significant bit first in response to control signal 11c. The N lines from the N stages of register 15 form an N-bit bus, all lines of which are applied to N different RACs (RAC(1)-RAC(N)). Thus at each clock cycle, a different N-bit word is used to simultaneously address the ROMs which are part of each RAC. The RAC(1) will have in its ROM $2^N$ constants which represent all the possible combinations of coefficients of the first column of the matrix C. For example, if the first column coefficients are $c_{1,1}, c_{2,1}, c_{3,1}, \ldots c_{N,1}$, then the ROM would store all of these coefficients individually and all possible sums of them, e.g. $c_{1,1}+c_{2,1}, c_{1,1}+c_{3,1}, c_{1,1}+c_{N,1}, c_{1,1}, +c_{2,1}+c_{3,1}$, etc., up to and including the sum of all of these column coefficients. As an example, for N=4, the computation of each element, $y_{k,1}$ of the column transform can be represented as follows: $c_{1,1}(110101001)+c_{2,1}(00101010)+c_{3,1}(11001111)+c_{4,1}(10101110)$, wherein the eight-bit words represent different data pixels forming a column of data. In this example the least significant bits of all of the data words would form the word 1010. This word would retrieve from the ROM of RAC(1) the stored value $c_{1,1}+c_{3,1}$ which would be applied to the shift register 25 of the RAC(1), shown in FIG. 4. On the next clock cycle the next most significant digit of all of the data word would be applied to all of the RACs to retrieve different values therefrom depending which RAC is being addressed and what the N digit word is. This retrieved word is also applied to the shift register through ADD/SUB circuit 23 of FIG. 4 wherein it is added to the previous contents of the shift register which are fed back to the ADD/SUB circuit with a right shift of 1-bit. Thus after the second addressing of the ROM 21, the shift register 25 will have stored therein the sum of the two retrieved words with the first one weighted by ½ (or divided by 2) to reflect the fact that it represents a bit of the data word of less significance. This process is repeated for each bit of the data word. The ADD/SUB circuit 23 performs ADD for the regular data bits and SUB (subtract) for the sign-bit. The final summation of all such retrieved and weighted words from the ROM equals one coefficient of the product matrix or of the one-dimensional transform. For example, if the elements of the product matrix $X^tC$, are $y_{k,l}$ the output of RAC(1) after the first column of input data has been processed in this manner will be $y_{1,1}$ and similarly the output of RAC(N) will be $y_{1,N}$. Thus the entire first row of the product matrix $X^tC$, will be available at the RAC outputs after completion of this computation. In response to control signal 11d from circuit 9, the accumulated contents of each RAC, $y_{k,1}-y_{k,N}$ are then simultaneously loaded in parallel on $n_2$ (or $n_3$) parallel lines into the stages, $U_1-U_N$ of output register 19, which is similar to the input register with an extra two-input multiplexer. The contents of register 19 would then be sequentially shifted out from stage $U_1$ thereof on $n_2$ (or $n_3$) parallel lines, to the transposition memory or to the two-dimensional processor output, in response to the control be required to load input register 13 with one column of data; thus every 16 cycles the control circuit 9 would be arranged to provide the signal 11b for effecting the transfer of the column of data to holding register 15. The register 19 can serially shift out its contents, $y_{k,1}$, while the RACs are computing the next row of the product matrix, and the input registers are collecting input data. As shown in FIG. 4, the output of the ROM 21 will have a word length of $n_4$-bits which is determined by the length of the words stored in the ROM. The signal 11f applied to circuit 23 from circuit 9 determines whether this circuit performs addition or subtraction. The control signals 11g and 11h applied to the shift register 25 are reset and parallel load signals.

The circuitry of both of the one-dimensional DCT processors are the same except for the number of bits per word. As indicated in FIG. 2, the first processor has an input word length of $n_1$ and an output word length of $n_2$. The second DCT processor 7 has input and output word lengths of $n_2$ and $n_3$, respectively.

While the circuitry of FIG. 3 and 4 requires no multipliers, it has serious limitations due to the number of constants which must be stored in each ROM thereof. For example, if N=16, the number of words required for each ROM of each RAC is $2^{16}$ or 65,536. ROMs of this size are not feasible with present day VLSI technology if the entire processor is to be implemented on a single chip. Two approaches have been adopted for reducing the ROM size, both of which require only modest additional circuitry. The first approach is a version of the decimation-in-frequency technique which has been used in the prior art in conventional Fast Fourier Transform (FFT) algorithms. The $(k,1)^{th}$ element of the product matrix $Y=X^tC$ is given by:

$$Y_{k,l} = x_k^t \cdot c_l = \sum_{m=1}^{N} x_{m,k} c_{m,l} \quad (3)$$

wherein $x_k$ is the $k^{th}$ column vector of X and $c_l$ is the $l^{th}$ column vector of C. Referring to the N×N DCT transfer matrix C defined in Equation (1), it can be shown that for even N, $c_{k,1}+c_{N+1-k,1}$ for $l=1,3,\ldots N-1$, and $c_{k,1}=c_{N+1-k,l}$ for $l=2,4,\ldots N$. With these relations, Equation (3) becomes:

$$Y_{k,l} = \sum_{m=1}^{N/2} u_{k,m} c_{m,l} \quad (4)$$

for $l=1,3 \ldots N-1$, where $u_{k,m}=x_{m,k}+x_{N-m+1,k}$, and $$y_{k,l} = \sum_{m=1}^{N/2} v_{k,m} c_{m,l} \quad (5)$$

for $l=2,4 \ldots N$, with $v_{k,m}=x_{m,k}-x_{N-m+1,k}$. Equations (4) and (5) imply that when the variables u and v replace the original data sequence x, the summation from 1 to N becomes a summation from 1 to N/2. Thus the number of data bits required to address each ROM is reduced by a factor of 2, and the number of required stored words is reduced by a factor of $2^{N/2}$. In principle, this decimation-in-frequency technique can be extended to more stages, as most FFT algorithms do. However, the savings may not be worthwhile because of the increasing irregularities involved. Thus to preserve the modular structure, only the first stage decimation was applied. This feature of the invention is illustrated by the circuit of FIG. 5.

Figure 5:
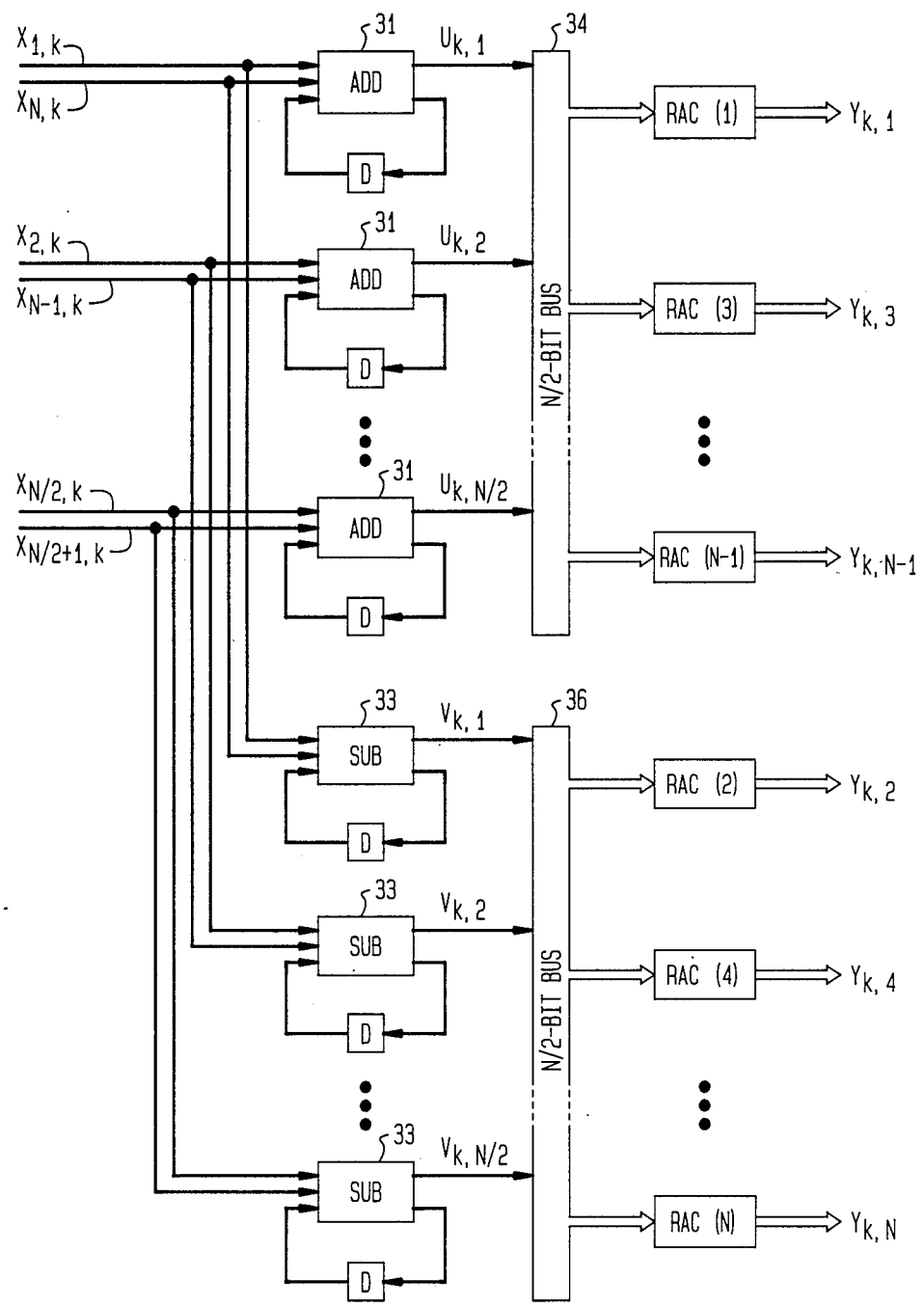
FIG. 5 is a block diagram of a DCT processor utilizing decimation-in-frequency.

In FIG. 5, N/2 serial adders 31 are provided for generating the variables u from N/2 different pairs of the original data sequence from register 15. As shown, the variable $u_{k,1}$ is formed by adding $x_{1,k}$ and $x_{N,k}$, $u_{k,2}$ from $x_{2,k}$ plus $x_{N-1,k}$, and $u_{k,N/2}$ from $x_{N/2,k}$ plus $x_{N/2+1,k}$. The same pairs of input data elements are subtracted from each other in N/2 one-bit serial subtractors 33 to yield the new variables $v_{k,1}, v_{k,2} \ldots v_{k,N/2}$. Thus pairs of data elements of each column of input data comprise the elements from the first and last row of the columns, the elements from the second and next to last row of the columns, the elements from the third and third to last row of the columns, etc. The input data bits $x_{k,1}$ of FIG. 5 would be obtained one bit at a time (in bit-serial format) from a holding register similar to that of FIG. 3 and the outputs of the serial adders and subtractors 31 and 33 would appear one bit at a time to form two N/2 line buses with each bus forming the inputs of two different groups of N/2 RACs. The N/2 line bus 34 associated with the adders 31 has the odd numbered RACs, 1,3, N−1 connected thereto and these RACs compute all of the elements of the inner vector products of the odd numbered columns, e.g., $y_{k,1}, y_{k,3}, y_{k,N-1}$. The N/2 line bus 36 associated with the subtractor circuits 33 has the even numbered RACs, 2,4, N connected thereto which compute the elements of the even numbered columns of the vector inner products.

The use of a first stage decimation circuit such as that of FIG. 5 will reduce the size of each ROM to 256 words for a 16×16 matrix, since each RAC is now addressed by 8-bit words.

The invention utilizes an additional technique to further reduce the ROM sizes. This additional techniques is based on the observation that the summations over index m, the number of data points in Equations (4) and (5), may be split into partial sums. If we chose to split (3) into two partial sums, then;

$$\sum_{m=1}^{N} x_{m,k} c_{m,l} = F_1(c_l, x_k) + F_2(c_l, x_k) \quad (6)$$

where $F_i(c_l, x_k) = \sum_{m=1+(i-1)N/2}^{iN/2} x_{m,k} c_{m,l}, i = 1,2$

Note that the summations in $F_1$ and $F_2$ contain only N/2 input samples instead of N samples. By splitting in this way each ROM with $2^N$ words is replaced by two smaller ROMs with $2^{N/2}$ words More precisely, the data words at the inputs of each RAC are split into two groups, the first groups consists of the bits foom 1 to N/2 and the second group the bits from data numbers (N/2)+1 to N. Thus the words used normally to address the RAC are split into two equal parts comprising the first and last halves thereof. Each of the smaller words is used to address separate ROMs, and the ROM outputs are added in parallel and the sum applied to the accumulator. The number of partial sums using this splitting technique can be any even number. For N=16, each ROM is replaced by two smaller ROMs. If N=32, each ROM can be replaced by four ROMs, in which case an additional stage of addition is required. For N=8, no splitting is needed because the ROM size is already very small.

Figure 6:
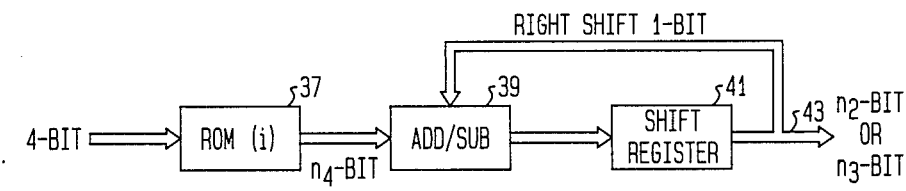
FIG. 6 is a diagram of a RAC which does not use partial sums.
Figure 7:
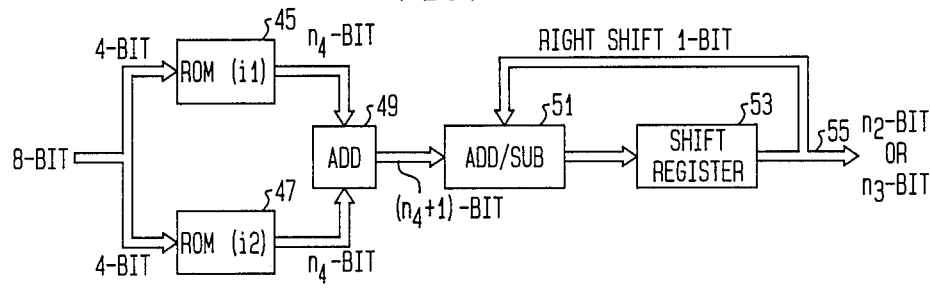
FIGS. 7 and 8 are diagrams of RACs which utilize partial sums.
Figure 8:
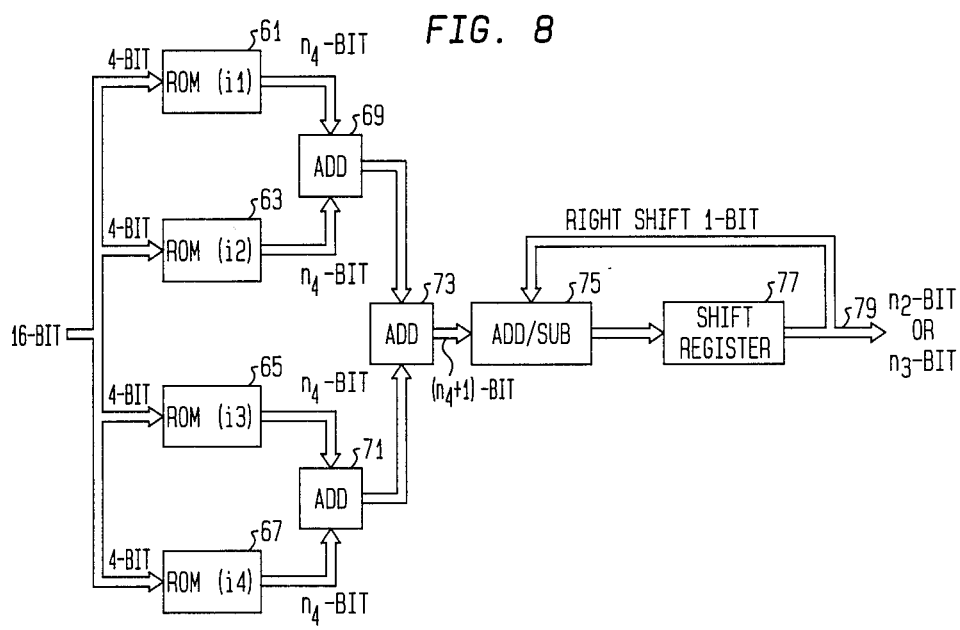

The implementation of the RACs using both the partial sum and first stage decimation-in-frequency techniques is shown in FIG. 6, 7 and 8 for 8×1, 16×1 and 32×1 DCTs, respectively. The RAC of FIG. 6 for an 8×1 DCT with a first stage decimation-in-frequency feature like that of FIG. 5 would include two four digit buses addressing the ROMs. Each ROM 37 storers only $2^4$ or 16 words and thus no partial sums are needed, the output of ROM 37 being applied through the ADD-/SUB circuit 39 and shift register 11 to the output 43. The 16×1 DCT RAC of FIG. 7 would have as a result of the decimation feature two eight bit buses which would be split as explained above into 2 4-bit words which are applied to two similar 16 word ROMs, 45 and 47. The adder 49 would sum the retrieved $n_4$-bit words from the two ROMs to yield a single $n_{4+1}$ bit word which is applied to the accumulator comprising the ADD/SUB circuit 51, the shift register 53 and the 1-bit right shift feedback path between the output of the shift register and the adder-subtractor 51. The RAC output at 55 would comprise words of $n_2$ (or $n_3$)-bits, which would be somewhat longer than $n_{4+1}$ bits.

The 32×1 DCT RAC of FIG. 8 includes a 16 bit line input bus which is split into 4 4-bit words for addressing four similar ROMs 61, 63, 65 and 67 each of which store 16 words. The $n_4$-bit words at the output of ROMs 61 and 63 are added in adder 69 and the similar words from ROMs 65 and 67 are applied to adder 71. These two adders have their outputs in turn applied to adder 73 which has its output applied to the accumulator which function the same as those previously described to compute one of the elements of an inner vector product.

By combining these two techniques, the required ROM size can be reduced significantly with only a modest increase in circuitry. For example, for N=16, direct implementation of a 16×16 two-dimensional DCT requires $2^{16} \times 16 \times 2 = 2^{21}$ words of ROM. On the other hand, using the two techniques described above, the circuitry of FIG. 7 requires only $2^4 \times 2 \times 16 \times 2 = 2^{10}$, approximately 1K words of ROM. With this size of ROM, the novel circuitry of the present invention is not only feasible but very efficient in terms of IC realization.

Figure 9:
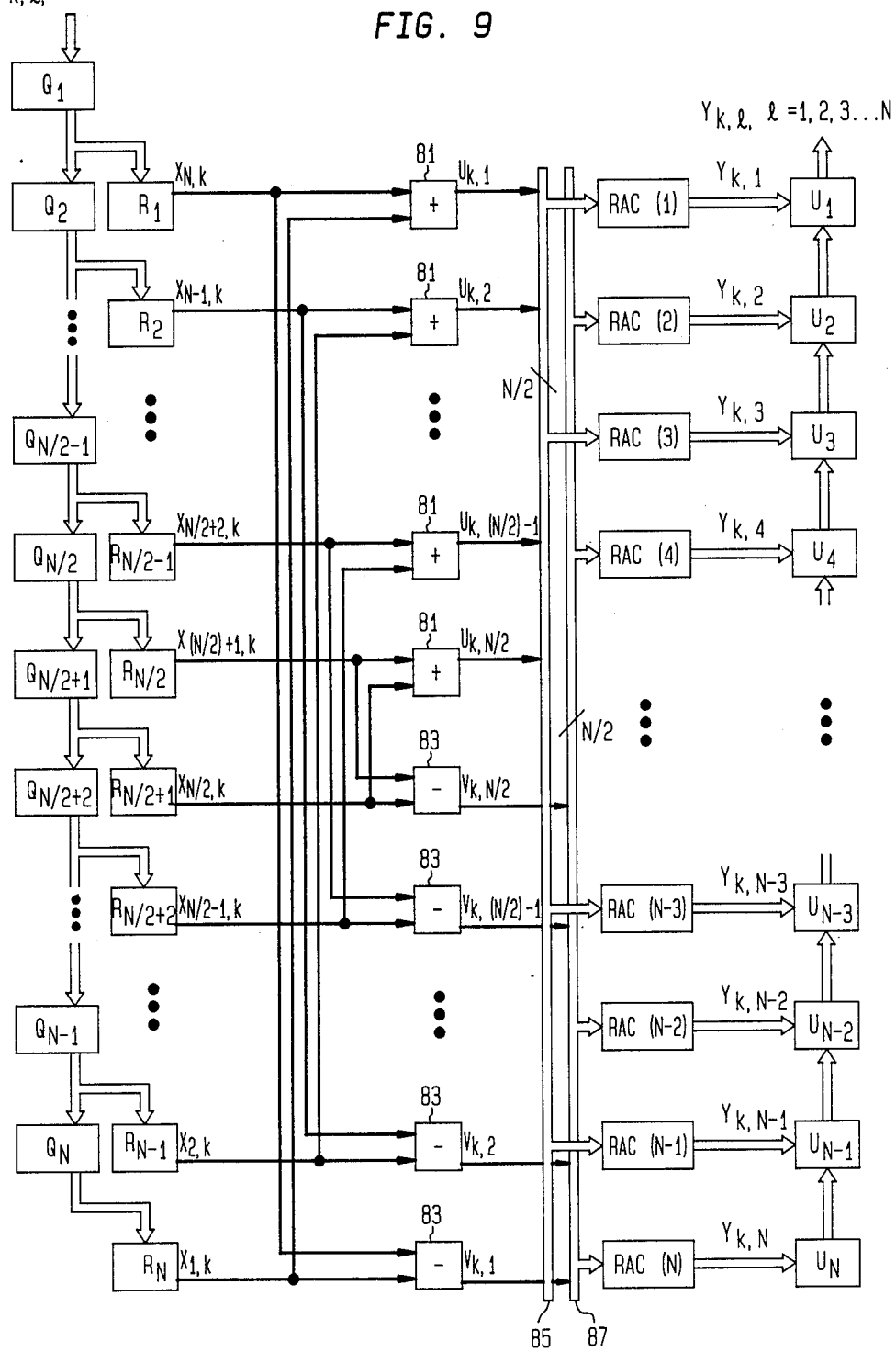
FIG. 9 is a complete diagram of the $N \times 1$ DCTs of FIG. 2.

FIG. 9 is a complete block diagram of the N×1 DCT with the decimation-in-frequency feature. The diagram of FIG. 9 emphasizes the regularity and modularity of this circuit design. In this FIG. the input register comprises N stages $Q_1$-$O_N$, each comprising $n_1$ (or $n_2$) bits, depending on whether the circuit comprises the first or second N×1 DCT Processor, respectively, of FIG. 2 the input columns of data, $x_{1,k}, x_{2,k} \ldots x_{N,k}$, being applied to $Q_1$ on $n_1$ (or $n_2$) parallel lines. N/2 serial adders 81 and a like number of serial subtractors 83 are provided and each has a pair of single lines from the stages $R_1$-$R_N$ of the holding register connected thereto. The N/2 bit bus 85 comprises bits derived from adders 81, and N/2 bit bus 87 bits from the subtractors 83. Note that the adder and subtractor which produce the first bits, $u_{k,1}$ and $v_{k,1}$ of both N/2 bit buses are both connected to the first and last holding register stages, $R_1$ and $R_N$. Similarly the adder and subtractor which produce the second bit of each of the words on the two buses are connected to the second and the next to last holding register stages, $R_2$ and $R_{N-1}$, and so on. Following this logical rule the last bit on each bus is derived from the adder and subtractor connected to the holding register stages N/2 and (N/2)+1. The N RACs of FIG. 9 are lined up in numerical order with the odd numbered ones connected to the bus 85 which is connected to all of the adders 81 and all even numbered RACs are connected to all of the subtractors 83 via bus 87. The column transform coefficients, $y_{k,1}, y_{k,2}, \ldots y_{k,N}$ are bit-parallel shifted from the RAC outputs to the stages $U_1$-$U_N$ of the output register simultaneously as in the previous embodiment and the contents of this register then sequentially shifted out.

The provision of input, output and holding registers as part of the N×1 DCT Processors minimizes the number of chip (or IC) input/output pins and simplifies the routing since each register array communicates only with its neighbors. Also, this circuitry facilitates concurrent operation in which almost all of the circuits are continually in operation performing different tasks. This is essential if real time processing is to be achieved on a single chip. Further, the use of bit-serial structure to implement the first stage decimation-infrequency reduces the circuitry required and simplifies routing.

By suitable control of the read and write addresses of the Transposition Memory, only N×N words of RAM are required for both the storing of the intermediate results (or matrix) and performing in the matrix transposition required upon the reading out of the s.ored intermediate results. The Transposition Memory (or RAM) will contain 16 by 16 words if N=16 and will have separate read and write ports as shown in FIG. 2. Since the intermediate results of the current block are continuously being written into memory from the first N×1 Processor while the intermediate results of the previous block are continuously being read out to the second N×1 Processor, the read/write operation must be arranged so that no information is destroyed before it is read out. One way to achieve this is to arrange the read/write control and the addresses so that each sample (or word) is written into the same location from which the sample of the previous block has been read out. In this way, each read and write operation takes a half of a clock cycle (T/2). Another way is to arrange it so that the write address lags the read address by one row or one column. In this way, each read and write operation can take a full cycle (T), however two sets of address decoders have to be used.

To achieve the desired matrix transposition, the data are read out of memory 5 column-wise if the previous block were written into the RAM row-wise, and vice-versa. So, for example for N=16, if the data of the previous block were written into the RAM in the sequence 0,1,2,3, ... etc., then the data are read out in the sequence 0,16,32,48, ... etc., and at the same time the data of the present block are written into the RAM in the same sequence (0,16,32,48, etc.,). In the next block, the data will read/write in the sequence 0,1,2,3 ... etc., again, and the operation repeats. The addresses can be generated by an eight bit counter and the change of the sequence can be achieved easily by exchanging the 4 most significant bits and the 4 least significant. This circuitry would be part of circuit 16 of FIG. 2. The Start-of-Block strobe is used to reset the address of the read/write operation. Note that the counter needed for controlling the RAM address in this way can be built using an adder and a register, with the control signal generated by a ROM.

In this two-dimensional processor, $n_1$ is 8 for most applications. The word lengths for $n_2$, $n_3$ and $n_4$ were determined by computer simulation of the circuit in which many images were digitized and the pixels thereof transformed according to the present circuitry and the inverse transformation then performed and the images reproduced. It was found that with $n_2=12$, $n_3=16$ and $n_4=9$, very high precision is obtained. For some applications such as low bit rate video where such high precision is not required, the number of bits for $n_2$, $n_3$, and $n_4$ can be reduced by 1 or 2.

While the invention has been described in connection with illustrative embodiments, obvious variations therein will be apparent to those skilled in the art without the exercise of invention, accordingly the invention should be limited only by the scope of the appended claims.

What is claimed is:

1. A two-dimensional Discrete Cosine Transform (DCT) processor which uses a pair of one-dimensional DCT processors to produce the two-dimensional DCT of an N×N matrix of input data by a row-column decomposition method, comprising;

a first N×1 DCT processor which computes the one-dimensional transform of said input data matrix, one column at a time, to yield a one-dimensional N×N intermediate transform matrix, an N×N transposition memory for storing said intermediate transform matrix, and a second N×1 DCT processor which computes the one-dimensional transform of the transpose of the said intermediate transform matrix stored in said trasposition memory to yield the desired two-dimensional DCT, wherein both of said N×1 DCT processors comprise;

an input N-stage input register to which a column of said matrix of input data or a row or column of said stored intermediate transform matrix is applied in bit-serial format, an N-stage holding register having its stages connected to the corresponding stages of said input register, and means to transfer the contents to said input register in bit-parallel format to said holding register each time that said input register fills up, means connected to said holding register to concurrently compute N vector inner products, said means comprising circuit means connected to said holding register to implement first stage decimation in frequency to thereby produce a pair of N/2 bit words from the N bit words received from said holding register, N RACs connected to sid circuit means, each said RAC comprising one or more read only memories (ROMs) and an accumulator, and wherein each of said RACs is addressed by one or the other of said N/2 bit words, an N stage output register having each of its stages connected to the corresponding accumulator of each corresponding said RAC, and means to concurrently transfer said N computed vector inner products to said output register.

2. The two dimensional DCT of claim 1 wherein said RACs are each provided with a partial sum features (or means) wherein each said RAC comprises two or more ROMs each of which is addressed by a different fraction of one or the other of said N/2 bit words received from said circuit means, each said RAC further comprising means to add the words retrieved from said two or more ROMs and means to apply the resulting added words to the accumulator associated with that RAC.

3. A two-dimensional Discrete Cosine Transform (DCT) processor which uses a pair of one-dimensional DCT processors to produce the two-dimensional DCT of an N×N matrix of input data by a row-column decomposition method, comprising;

a first N×1 DCT processor which computes the one-dimensional transform of said input data matrix, one column at a time, to yield a one-dimensional intermediate transform matrix, a N×N transposition memory for storing said intermediate trnsform matrix, and a second N×1 DCT processor which computes the one-dimensional transform of the transpose of the said intermediate transform matrix stored in said transposition memory to yield the desired two-dimensional DCT, wherein both of said N×1 DCT processors comprise;

an N-stage input register to which a column of said matrix of input data or a row or column of said stored intermediate transform matrix is applied in bit-serial format, an N-stage holding register having its stages connected to the corresponding stages of said input register, and means to transfer the contents of said input register in bit-parallel format to said holding register each time the said input register fills up, distributed arithmetic circuitry connected to said holding register to concurrently compute N vector inner products, said distributed arithmetic circuitry comprising; first stage decimation in frequency circuitry connected to the output of said holding register, said decimation in frequency circuitry comprising means to produce a pair of N/2 bit words from each N bit word received from said holding register, said distributed arithmetic circuitry further comprising N RACs each comprising one or more ROMs plus an accumulator said RACs connected to the output of said decimation in frequency circuitry, and an N-stage output register having each of its stages connected to the corresponding accumulator of each of said RACs, said output register comprising means to receive said vector inner products from said accumulators in bit-parallel format and means to shift said inner products out in bit-serial format.

4. The processor of claim 3 wherein N=16 and wherein said matrix of input data comprises video pixels encoded in 8-bit binary words and wherein said circuitry is implemented on a single chip.

5. An N×1 Discrete Cosine Transform (DCT) processor comprising;

an N-stage input register to which a column or row of input data may be applied in bit-serial format, an N-stage holding register having its stages connected to the corresponding stages of said input register, and means to transfer the contents of said input register in bit-parallel format to said holding register each time the said input register fills up, distributed arithmetic circuitry connected to said holding register to concurrently compute N vector inner products, said distributed arithmetic circuitry comprising; first stage decimation in frequency circuitry connected to the output of said holding register, said decimation in frequency circuitry comprising means to produce a pair of N/2 bit words from each N-bit word received from said holding register, said distributed arithmetic circuitry further comprising N RACs each comprising one or more read only memories (ROMs) plus an accumulator, said RACs being connected to the output of said decimation in frequency circuitry, and an output register having each of its stages connected to the corresponding accumulator of each of said RACs, said output register comprising means to receive said vector inner products from said accumulators in bit-parallel format and means to shift said inner products out in bit-serial format.

6. The DCT processor of claim 5 wherein said RACs are each provided with a partial sum feature wherein each said RAC comprises two or more ROMs each of which is addressed by a different fraction of one or the other of said N/2 bit words received from said decimation in frequency circuitry, each said RAC further comprising means to add the words retrieved from said two or more ROMs by said different fraction of said N/2 bit words, and means to apply the resulting added words to the accumulator associated with that RAC.

7. A two-dimensional Discrete Cosine Transfor:m (DCT) processor for producing the two-dimensional DCT transform of an N×N matrix of input data, comprising;

first and second N×1 DCT processors and an N×N transposition memory, means to apply the transpose of said N×N matrix of input data to said first N×1 DCT processor to thereby compute an intermediate N×N matrix, means to store said intermediate matrix in said transposition memory, and, means to read out the transpose of said stored intermediate matrix to the input of said second N×1 DCT processor to thereby compute the two dimensional DCT of said matrix on input data, wherein each of said N×1 DCT processors comprises means to concurrently compute N vector inner products by means of circuitry which performs distributed arithmetic with first stage decimation in frequency and partial sums, and wherein said transposition memory comprises an N×N random access memory (RAM) array with separate read and write terminals and a read/write control circuit connected thereto and wherein the output of said first DCT processor is read in alternately row-wise and column-wise and the input of said second DCT processor is alternately read out from said memory row-wise and column-wise by said control circuit in such a way that the transposition of the stored matrix is achieved for application to said second N×1 DCT processor.

* * * * *

UNITED STATES PATENT AND TRADEMARK OFFICE
CERTIFICATE OF CORRECTION

PATENT NO. : 4,791,598

DATED : December 13, 1988

INVENTOR(S) : Ming-Lei Liou, Ming-Ting Sun, Lancelot Wu

It is certified that error appears in the above-identified patent and that said Letters Patent is hereby corrected as shown below:

Column 7, line 50, change "control" to --control signal 11e. For example, if N=16, 16 clock cycles would--.

Column 8, line 45, change "$2N/2$" to --$2^{N/2}$--.

Column 10, line 17, change "216" to --$2^{16}$--.

Column 10, line 20, change "24" to --$2^4$--.

Column 10, line 28, change "$O_N$" to --$Q_N$--.

Signed and Sealed this

Sixth Day of November, 1990

Attest:

HARRY F. MANBECK, JR.

*Attesting Officer*     *Commissioner of Patents and Trademarks*